(12) United States Patent
Angelidis et al.

(10) Patent No.: US 9,684,997 B2
(45) Date of Patent: Jun. 20, 2017

(54) EFFICIENT RENDERING OF VOLUMETRIC ELEMENTS

(71) Applicants: Alexis Angelidis, Albany, CA (US); Bill Watral, Piedmont, CA (US); Danny Nahimias, San Francisco, CA (US)

(72) Inventors: Alexis Angelidis, Albany, CA (US); Bill Watral, Piedmont, CA (US); Danny Nahimias, San Francisco, CA (US)

(73) Assignee: Pixar, Emeryville, CA (US)

( * ) Notice: Subject to any disclaimer, the term of this patent is extended or adjusted under 35 U.S.C. 154(b) by 153 days.

(21) Appl. No.: 13/928,984

(22) Filed: Jun. 27, 2013

(65) Prior Publication Data

US 2014/0002458 A1    Jan. 2, 2014

Related U.S. Application Data

(60) Provisional application No. 61/798,614, filed on Mar. 15, 2013, provisional application No. 61/665,204, filed on Jun. 27, 2012.

(51) Int. Cl.
*G06T 15/80* (2011.01)
*G06T 15/00* (2011.01)

(52) U.S. Cl.
CPC ............ *G06T 15/80* (2013.01); *G06T 15/005* (2013.01); *G06T 2210/36* (2013.01)

(58) Field of Classification Search
CPC ................................ G06T 15/00; G06T 15/80
USPC ........................................................ 345/426
See application file for complete search history.

(56) References Cited

U.S. PATENT DOCUMENTS

| | | | |
|---|---|---|---|
| 5,729,672 A * | 3/1998 | Ashton ........................ 345/589 |
| 6,744,430 B1 * | 6/2004 | Shimizu ....................... 345/420 |
| 6,760,024 B1 * | 7/2004 | Lokovic et al. .............. 345/421 |
| 2004/0125103 A1 * | 7/2004 | Kaufman ............. G06T 15/005 345/419 |
| 2005/0251038 A1 * | 11/2005 | Liang ..................... G06T 19/00 600/437 |
| 2006/0077204 A1 * | 4/2006 | Pfister et al. ................ 345/424 |
| 2006/0279570 A1 * | 12/2006 | Zhou et al. .................. 345/426 |

* cited by examiner

*Primary Examiner* — Devona Faulk
*Assistant Examiner* — Hai Tao Sun
(74) *Attorney, Agent, or Firm* — Patterson + Sheridan, LLP (57) ABSTRACT

Techniques for determining a shading rate of a volumetric element in a rendered scene when the rendered scene is viewed from a first point of view are provided. Embodiments determine a viewable area of the volumetric element, as viewed from the first point of view. A shading rate to use in processing the volumetric element is then determined, based on the determined viewable area. Embodiments processing the volumetric element at the determined shading rate using one or more shaders.

15 Claims, 5 Drawing Sheets

EFFICIENT RENDERING OF VOLUMETRIC ELEMENTS

CROSS-REFERENCE TO RELATED APPLICATIONS

This application claims benefit of both U.S. provisional patent application Ser. No. 61/665,204, filed Jun. 27, 2012, and U.S. provisional patent application Ser. No. 61/798,614, filed Mar. 15, 2013. The aforementioned provisional patent applications 61/665,204 and 61/798,614 are herein incorporated by reference in their entirety.

BACKGROUND

Field of the Invention

The present disclosure relates to the field of computer animation and, in particular, to techniques for efficient rendering of volumetric elements (also referred to herein as "voxels").

Description of the Related Art

Today, many graphic processing units (GPUs) are configured to host all of the computations necessary to generate high-quality graphics on computer screens. Doing so has the advantage of leaving a computing device's central processing unit (CPU) available for other tasks. For instance, many modern GPUs can render graphics by processing numerous programs called "shaders." Generally speaking, a shader is a specialized computer program configured to perform an operation for rendering a two-dimensional (2D) or three-dimensional (3D) graphic. Additionally, realistic scenes may be generated by rendering geometry with various virtual materials that are controlled by the shaders. For instance, such materials could be represented in the program code of a given shader, which processes a variety of inputs (including texture maps, light locations, and other data) to generate the visual result. Through the use of shaders, developers can control virtually any graphics or graphic effect by incorporating different vertex shading, primitive shading, and pixel shading effects.

Currently, rendering complex 3D graphic scenes in real-time may consist of supporting parallel-architecture processors in conjunction with customized logic units to hide latency by distributing the overhead across multiple parallel units. These pipelines are designed around a primitive rasterization pipeline. Such a primitive rasterization pipeline can convert (or rasterize) a collection of projected pixel representations, when provided a high-level 3D description of a collection of linear primitives (e.g., points, line segments, triangles, etc.). In many existing 3D hardware technologies, shaders are used to define an operation(s) performed at certain stages of the rendering process. Examples of such operations include, without limitation, transformations of the vertices of the primitives and computing the color of a single pixel on the screen. Such shaders may also define a small amount of work to be performed in large parallel execution batches. Such parallel execution batches may be distributed across many specialized processors on a GPU.

SUMMARY

Embodiments provide a method, system and computer-readable medium for determining a shading rate of a volumetric element in a rendered scene, when the rendered scene is viewed from a first point of view. The method, system and computer-readable medium include determining a viewable area of the volumetric element, as viewed from the first point of view. Additionally, the method, system and computer-readable medium include determining a shading rate to use in processing the volumetric element, based on the determined viewable area and further based on a volumetric element density within a region of the rendered scene. The method, system and computer-readable medium also include processing the volumetric element at the determined shading rate using one or more shaders.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Computer graphic images may be created by mathematically modeling the interaction of light within a three dimensional scene, from a given point of view. The result of this process (known as "rendering") is the generation of a two-dimensional image of the scene from the given point of view. In some ways, the rendering process is analogous to taking a photograph of a real-world scene. Additionally, rendering can be used to create an animated sequence, by rendering a sequence of images of a particular scene, as the scene gradually changes over time. In recent years, a great deal of effort has been devoted to creating rendered images and animations that are realistic in appearance.

Procedurally-generated data can also be used to provide fine details in computer graphics images and animation. Examples of elements that may be procedurally generated include, without limitation, hair, fur, grass, trees, rocks, and other elements of a scene. Procedures, such as shading programs (also referred to herein as "shaders"), script programs, stand-alone programs, and dynamically loaded programs can generate large amounts of data using a relatively small amount of input data. Thus, a user can provide the procedure with a small amount of input parameters, in order to add a large amount of detail to a scene. As such, these procedures can save users a great deal of time and effort, as opposed to adding this detail manually. Additionally, procedures can specify other attributes of a scene, including (without limitation) scene geometry, object geometry, texture maps, lighting and shading properties, and animations. For example, a user could use a hair generation procedure to add millions of hairs to an animated character by specifying a few parameters and invoking the procedure. In contrast to modeling and animating the millions of hairs by hand, the user can save a substantial amount of time through the use of the hair generation procedure. Thus, creating large data sets through the use of such procedures is frequently a more efficient and cost effective solution, rather than having a modeler, artist, or animator manually create and add the data.

Although procedures can be used to add large amounts of detail to a scene, there can also be challenges to using procedures. For instance, if a procedure application is not carefully controlled, the procedure could add an excessive amount of data to a scene, overwhelming the renderer. That is, when there is too much detail in a scene, the renderer may take an excessive amount of time and computational resources to generate images based on the scene. Such an excessive amount of detail may even crash the rendering system in certain circumstances.

Additionally, some renderers are configured to create images of a scene in multiple, small pieces, such as scanlines or "buckets" of adjacent pixels. For example, a scanline could include all of the pixels in a single row of an image. As another example, a bucket could include a 16 by 16 group of pixels. Moreover, some renderers can be configured to process each scanline, bucket, or other piece of the image independently, allowing the rendering process to be highly parallelized. For instance, for each piece of the image, the renderer could process the scene data to determine which portions of the scene are potentially visible to that piece. The potentially visible portions of the scene for each image piece could then be evaluated to determine the color, transparency, and/or other values for each pixel in the image piece.

One technique for creating shader is through the use of a highly specialized programming language designed to target the hardware architectures available. A compiler for the specialized programming language may then take the code and reduce it down to instructions that the hardware (e.g., GPUs, CPUs, etc.) and any associated device driver(s) can use. Additionally, shaders may be compiled into an abstract binary form, which a device driver could then map to particular hardware for execution. For instance, developers may use this technology to customize the rendering pipeline, by only including a behavior(s) desired for a specific application. For example, assume that a particular developer is creating an application that performs a non-photorealistic 3D rendering of very complex themes. In such an example, the developer could optimize one or more shaders to be very simple, in order to maximize the complexity of the scene. As another example, if the developer wishes to have high-fidelity material properties and/or lighting effects applied to a less complex scene, the developer could create a highly-customized shader, in order to produce very realistic and complex effects from the less complex scene.

For instance, consider a scene in which an object is exposed to multiple light sources. Here, one of the light sources could be a simple ambient light (e.g., produced by a moon within the scene), while a second one of the light sources could be a lamppost down a street within the scene. With the first light source (e.g., the moon), a shader could be written to control the light emitting from the moon, where the light is constant and is represented by a simple program that disperses the light throughout the scene. With regard to the lamp post, however, a more complex shader could be written, such that the light from the lamp post only shines in specific directions, and does not bend around corners within the scene. To produce such an effect, a more complex shader could be written to govern the light from the lamp post. Here, the more complex shader may require a more complex computation, relative to the shader written to govern the light emitting from the moon. In either scenario, a GPU could rasterize pixels according to the underlying computations from each shader.

Generally speaking, one way to control the processing requirements of a given shader is by altering the frequency at which the shader samples the scene (or elements within the scene). As used herein, such a frequency is referred to as a "shading rate." For instance, in Pixar's RenderMan®, the shading rate is expressed as a specified area of pixels, in which approximately a predefined number of samples will occur. So, for example, a shading rate of 1.0 specifies an area of a single pixel, while a shading rate of 10.0 specifies an area of 10 pixels. In such an embodiment, a larger shading rate would indicate a lower density of samples, while a lower shading rate would indicate a higher density of samples. Generally, rendering a scene using a higher density of shader samples (e.g., a lower shading rate specifying a smaller area of pixels) will produce a higher quality image, relative to rendering the scene using a lower density of shader samples (e.g., a higher shading rate specifying a larger area of pixels). While producing a higher quality image is generally preferable, rendering the scene using a significant number of samples can also consume more time and processing resources.

Currently, the shading rates for use within a given scene are configured manually. For example, a graphic designer who created the objects in the given scene could assign an initial shading rate for use in rendering the scene. However, it is possible that the graphic designer may assign an initial shading rate that errs on the side of more detail in the rendered scene and thus consumes additional time and computing resources when the scene is rendered. While such a high level of detail may be preferable for some scenes, it is oftentimes not feasibly possible to render each and every scene of an animation (e.g., an animated film) using the highest level of detail, due to the time and resource cost of rendering the scenes using such a high level of detail. As such, the initial shading rates may be manually adjusted before (or during) the rendering process, in order to achieve the desired effect in the rendered scene while using a feasible amount of computing and temporal resources.

Figure 1:
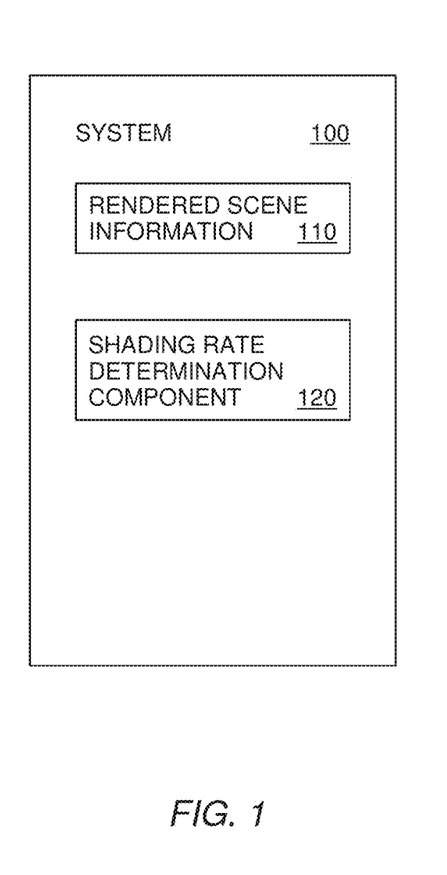
FIG. 1 is a block diagram illustrating a system configured with a shading rate determination component, according to one embodiment described herein.

As such, embodiments provide techniques for determining a shading rate of a volumetric element in a rendered scene, when the rendered scene is viewed from a first point of view are provided. Generally, a volumetric element represents a volume within the three-dimensional (3D) scene being rendered. An exemplary embodiment is shown in FIG. 1, which is a block diagram illustrating a system configured with a shading rate determination component, according to one embodiment described herein. Here, the system 100 contains rendered scene information 110 and a shading rate determination component 120. The rendered scene information 110 represents data pertaining to a 3D scene, including volumetric elements within the 3D scene.

Generally, the shading rate determination component 120 is configured to determine a shading rate(s) for use in rendering the rendered scene information 110. For instance, the shading rate determination component 120 could determine a viewable area of one of the volumetric elements, as viewed from the first point of view. Here, the first point of view represents the viewpoint at which the 3D scene is being viewed, when the 2D representation of the 3D scene is rendered. The viewable area generally refers to a size of the volumetric element, as viewed from the first point of view. For instance, a volumetric element shaped as a right rectangular prism could have a smaller size when viewed from a first axis, and could have a larger size when viewed from a second axis.

Upon determining the viewable area of the volumetric element, shading rate determination component 120 could determine a shading rate for use in processing the volumetric element, based on the determined viewable area. For instance, in one embodiment, the shading rate determination component 120 could determine the shading rate proportional to the viewable area of the volumetric element, such that the greater the viewable area, the greater the shading rate. In a particular embodiment, the shading rate determination component 120 may multiply the viewable area of the volumetric element by a predetermined constant value, in order to calculate the shading rate. That is, since the viewable area and the shading rate may be measured using different units, the shading rate determination component 120 could use a constant value as a multiplier, in order to compute the shading rate based on the viewable area of the volumetric element. The shading rate determination component 120 could then process the volumetric element at the determined shading rate using one or more shaders, when rendering the 2D representation of the 3D scene. Advantageously, doing so automates the process of selecting a shading rate(s) when rendering a scene.

Figure 2:
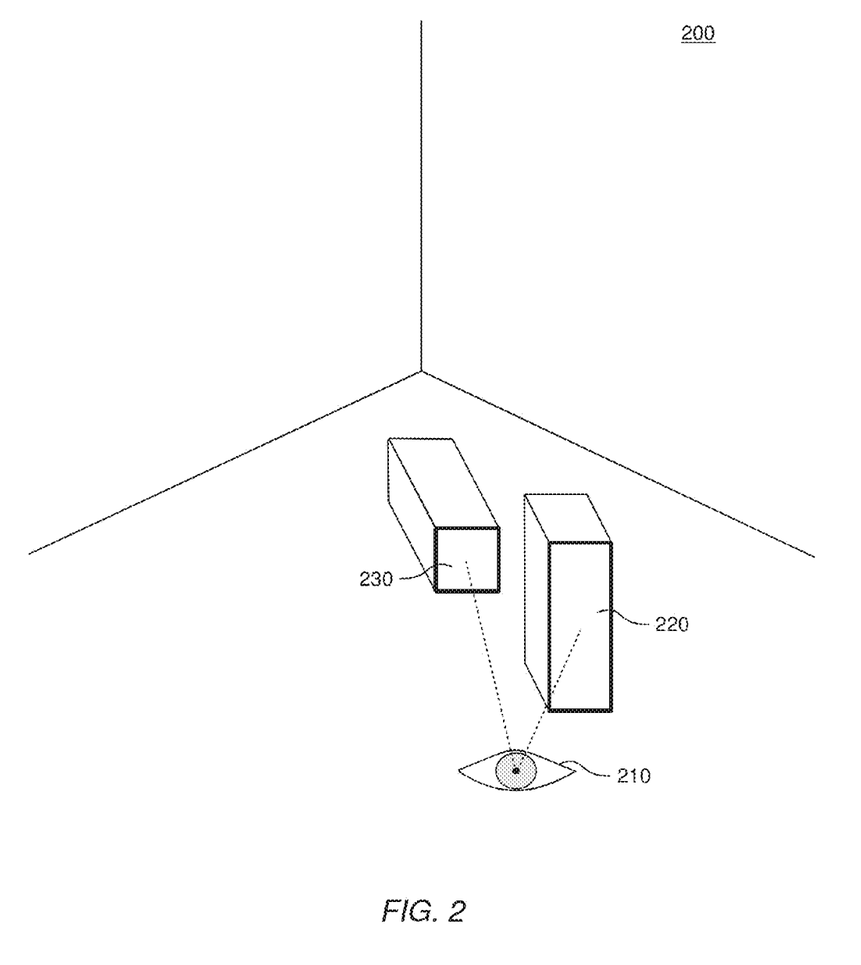
FIG. 2 illustrates a three-dimensional scene containing volumetric elements, according to one embodiment described herein

FIG. 2 illustrates a three-dimensional scene containing volumetric elements, according to one embodiment described herein. Here, the 3D scene 200 includes a viewpoint 210, a first volumetric element 220 and a second volumetric element 230. While only the two volumetric elements 220 and 230 are shown within the 3D scene 200, such a depiction is for illustrative purposes only, and on e of ordinary skill in the art will recognize that a 3D scene can contain any number of different volumetric elements of various shapes and sizes, consistent with the functionality described herein.

Here, the volumetric elements 220 and 230 are shown as right rectangular prisms of equal size, but having different orientations. In the depicted example, the volumetric element 220 has a relatively large viewable area, relative to the viewpoint 210, while the volumetric element 230 has a relatively small viewable area, relative to the viewpoint 210. As such, the shading rate determination component 120 could assign a greater shading rate to the volumetric element 220, and could assign a lesser shading rate to the volumetric element 230. Advantageously, doing so provides an efficient and automated way for assigning shading rates, when rendering the 3D scene 200. Moreover, one of ordinary skill in the art will recognize that the viewable areas for the volumetric elements 220 and 230 may change, depending on the orientation of the viewpoint 210. Thus, the shading rate determination component 120 could adjust the shading rate in an optimal manner, depending on the viewpoint from which the 3D scene 200 is viewed.

In one embodiment, the shading rate determination component 120 is configured to divide a 3D scene into various regions, and to determine a voxel density within one of the regions. For example, the voxel density could be determined by calculating the number of voxels within the region. The shading rate determination component 120 could then calculate the shading rate for use in processing the region, based on the determined voxel density. For instance, the shading rate determination component 120 could calculate the shading rate, such that the shading rate is inversely proportional to the determined voxel density. That is, in such an embodiment, a higher voxel density could indicate a smaller average voxel size within the region. Thus, by calculating the shading rate to be inversely proportional to the voxel density within the region, the shading rate determination component 120 can effectively calculate the shading rate to be proportional to the average voxel size within the region.

Figure 3:
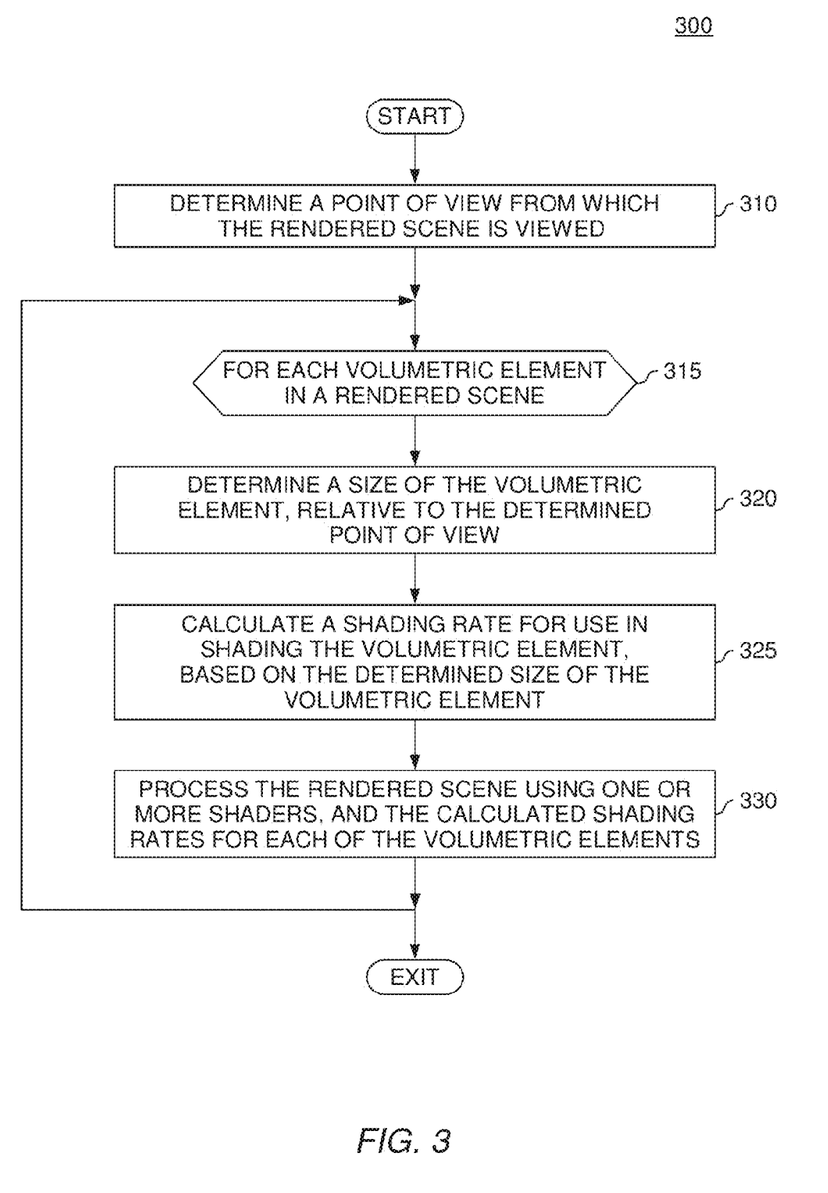
FIG. 3 is a flow diagram illustrating a method of determining shading rates, according to one embodiment described herein.

FIG. 3 is a flow diagram illustrating a method of determining shading rates, according to one embodiment described herein. As shown, the method 300 begins at block 310, where the shading rate determination component 120 determines a point of view from which a 2D image of a 3D scene is to be rendered. For example, the point of view could be specified as a location and a direction within the 3D scene (e.g., the point of view 210 in the scene 200). Once the shading rate determination component 120 determines the point of view from which the 3D scene is viewed, the method 300 enters a loop 315 for each volumetric element in the 3D scene, e.g., the volumetric elements include voxels 220 and 230 in the scene 200.

For the respective volumetric element, the shading rate determination component 120 determines a size of the volumetric element, relative to the determined point of view (block 320). For instance, the shading rate determination component 120 could determine a viewable area of the volumetric element, from the determined point of view. Generally, the viewable area of the volumetric element can depend on, without limitation, the size of the volumetric element, the shape of the volumetric element, and the volumetric element's orientation relative to the determined point of view. Once the size of the volumetric element is determined, the shading rate determination component 120 calculates a shading rate for use in processing the volumetric element using one or more shaders (block 325). In the depicted example, the shading rate determination component 120 calculates the shading rate based on the determined size of the volumetric element. For instance, the shading rate determination component 120 could determine the shading rate proportional with the size of the volumetric element, such that volumetric elements with larger sizes will be assigned larger shading rates, relative to volumetric elements having smaller sizes relative to the point of view.

Once all the volumetric elements within the 3D scene are processed, the shading rate determination component 120 then processes the 3D scene using one or more shaders and the calculating shading rates for each of the volumetric elements (block 330), and the method 300 ends. In one embodiment, the shading rate determination component 120 is configured to determine shading rates only for volumetric elements that are visible from the determined point of view. That is, if a particular volumetric element is occluded by one or more other volumetric elements, the shading rate determination component 120 may not calculate a shading rate or a size of the particular volumetric element, as it would not be seen from the determined point of view.

Figure 4:
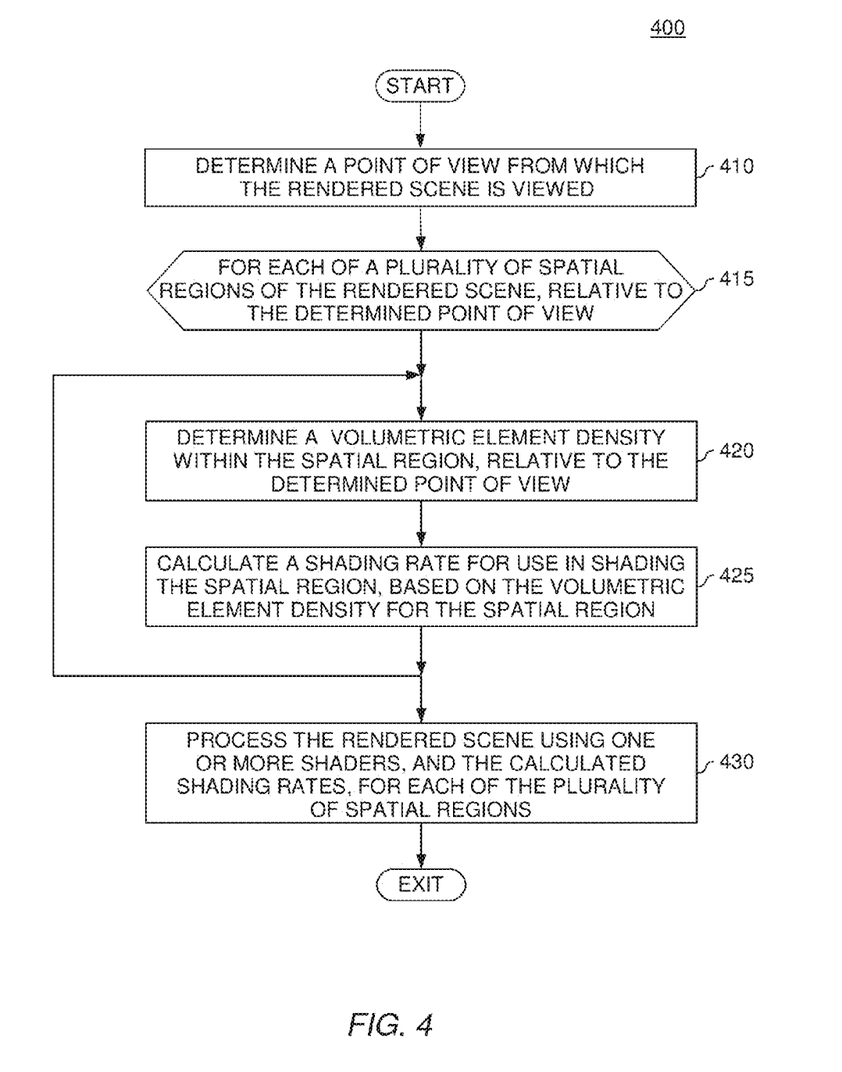
FIG. 4 is a flow diagram illustrating a method of determining shading rates, according to one embodiment described herein.

In addition to determining shading rates based on the size of a volumetric element, the shading rate determination component 120 can also be configured to calculate the shading rate based on a voxel density within a region of the 3D scene. An example of this is shown in FIG. 4, which is a flow diagram illustrating a method of determining shading rates, according to one embodiment described herein. As shown, the method 400 begins at block 410, where the shading rate determination component 120 determines a point of view from which the 3D scene is viewed. The method 400 then enters a loop 415, where for each of a plurality of spatial regions within the 3D scene, the shading rate determination component 120 determines a voxel density within the respective spatial region, relative to the determined point of view (block 420). For instance, a particular spatial region could represent a 2D area of a representation of the 3D scene, when viewed from the determined point of view (e.g., a portion of a 2D image rendered from the 3D scene). The shading rate determination component 120 could then determine a number of voxels within the spatial region, as the voxel density for the spatial region.

Once the voxel density is determined, the shading rate determination component 120 calculates a shading rate for use in processing the spatial region using one or more shaders (block 425). In one embodiment, the shading rate determination component 120 is configured to determine the shading rate to be inversely proportional to the voxel density within the spatial region, such that the greater the number of voxels within the spatial region, the smaller the shading rate. As discussed above, in some embodiments, the shading rate is measured in units of pixels, where a smaller shading rate is generally representative of a higher frequency of shader samples, and a larger shading rate is representative of a lower frequency of shader samples.

Once the shading rates for the spatial regions are determined, the shading rate determination component 120 processes the 3D using one or more shaders and the determined shading rates (block 430). Once the shading rate determination component 120 has processed the 3D scene, the method 400 ends. Advantageously, doing so provides an automated and intelligent way of determining the shading rates to use in rendering a 3D scene, based on the size (and/or density) of voxels within the 3D scene.

Figure 5:
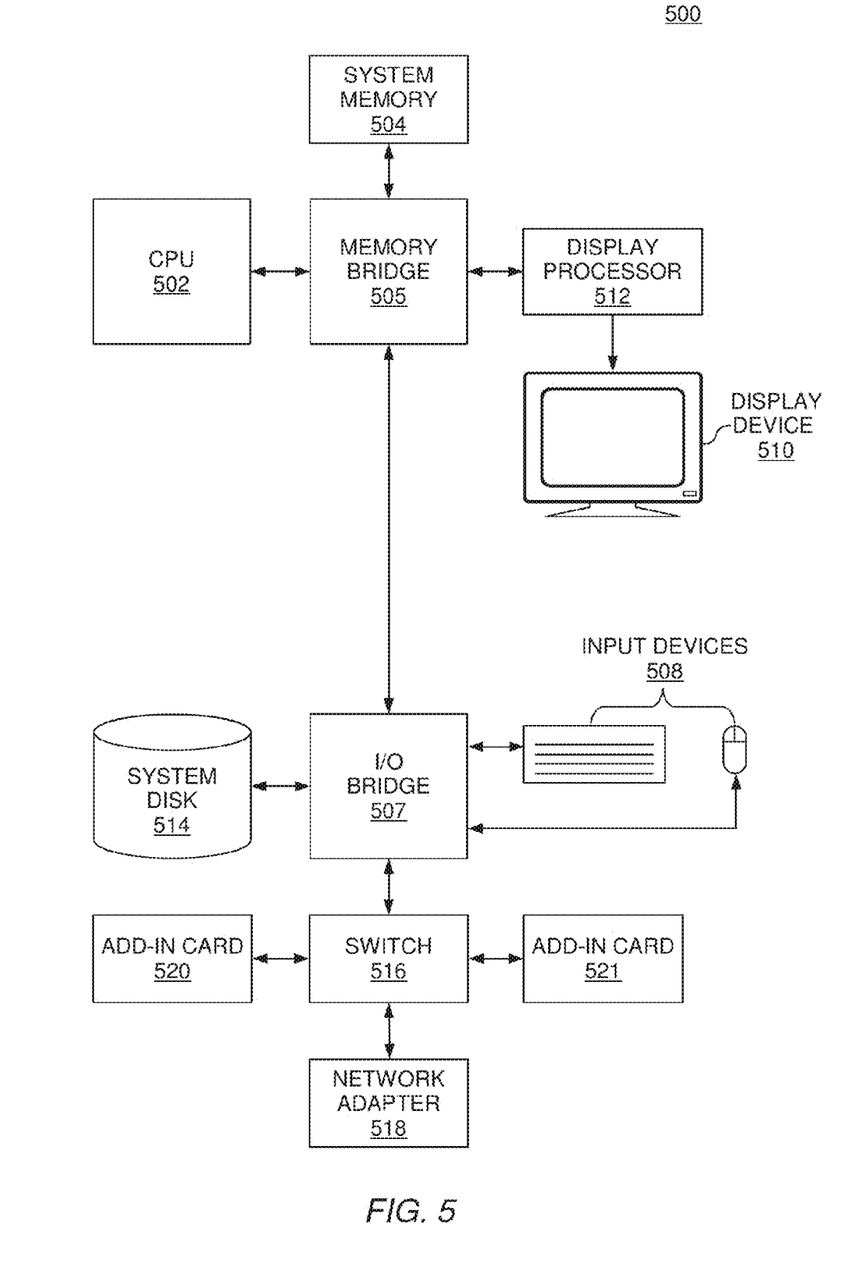
FIG. 5 is a block diagram illustrating a system configured with a shading rate determination component, according to one embodiment described herein.

FIG. 5 is a block diagram illustrating a system configured with a shading rate determination component, according to one embodiment described herein. Generally, the system 500 may be a personal computer, video game console, personal digital assistant, rendering engine, or any other device suitable for practicing one or more embodiments of the present invention. As shown, the system 500 includes a central processing unit (CPU) 502 and a system memory 504 communicating via a bus path that may include a memory bridge 505. CPU 502 includes one or more processing cores, and, in operation, CPU 502 is the master processor of system 500, controlling and coordinating operations of other system components. System memory 504 stores software applications and data for use by CPU 502. CPU 502 runs software applications and optionally an operating system. Memory bridge 505, which may be, e.g., a Northbridge chip, is connected via a bus or other communication path (e.g., a HyperTransport link) to an I/O (input/output) bridge 507. I/O bridge 507, which may be, e.g., a Southbridge chip, receives user input from one or more user input devices 508 (e.g., keyboard, mouse, joystick, digitizer tablets, touch pads, touch screens, still or video cameras, motion sensors, and/or microphones) and forwards the input to CPU 502 via memory bridge 505.

A display processor 512 is coupled to memory bridge 505 via a bus or other communication path (e.g., a PCI Express, Accelerated Graphics Port, or HyperTransport link); in one embodiment display processor 512 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 504.

Display processor 512 periodically delivers pixels to a display device 510 (e.g., a screen or conventional CRT, plasma, OLED, SED or LCD based monitor or television). Additionally, display processor 512 may output pixels to film recorders adapted to reproduce computer generated images on photographic film. Display processor 512 can provide display device 510 with an analog or digital signal.

A system disk 514 is also connected to I/O bridge 507 and may be configured to store content and applications and data for use by CPU 502 and display processor 512. System disk 514 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 516 provides connections between I/O bridge 507 and other components such as a network adapter 518 and various add-in cards 520 and 521. Network adapter 518 allows system 500 to communicate with other systems via an electronic communications network, and may include wired or wireless communication over local area networks and wide area networks such as the Internet.

Other components (not shown), including USB or other port connections, film recording devices, and the like, may also be connected to I/O bridge 507. For example, an audio processor may be used to generate analog or digital audio output from instructions and/or data provided by CPU 502, system memory 504, or system disk 514. Communication paths interconnecting the various components in FIG. 5 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 512 incorporates circuitry optimized for graphics and video processing, including, for example, video output circuitry, and constitutes a graphics processing unit (GPU). In another embodiment, display processor 512 incorporates circuitry optimized for general purpose processing. In yet another embodiment, display processor 512 may be integrated with one or more other system elements, such as the memory bridge 505, CPU 502, and I/O bridge 507 to form a system on chip (SoC). In still further embodiments, display processor 512 is omitted and software executed by CPU 502 performs the functions of display processor 512.

Pixel data can be provided to display processor 512 directly from CPU 502. In some embodiments of the present invention, instructions and/or data representing a scene are provided to a render farm or a set of server computers, each similar to system 500, via network adapter 518 or system disk 514. The render farm generates one or more rendered images of the scene using the provided instructions and/or data. These rendered images may be stored on computer-readable media in a digital format and optionally returned to system 500 for display. Similarly, stereo image pairs processed by display processor 512 may be output to other systems for display, stored in system disk 514, or stored on computer-readable media in a digital format.

Alternatively, CPU 502 provides display processor 512 with data and/or instructions defining the desired output images, from which display processor 512 generates the pixel data of one or more output images, including characterizing and/or adjusting the offset between stereo image pairs. The data and/or instructions defining the desired output images can be stored in system memory 504 or graphics memory within display processor 512. In an embodiment, display processor 512 includes 3D rendering capabilities for generating pixel data for output images from instructions and data defining the geometry, lighting shading, texturing, motion, and/or camera parameters for a scene. Display processor 512 can further include one or more programmable execution units capable of executing shader programs, tone mapping programs, and the like.

CPU 502, render farm, and/or display processor 512 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 504 is connected to CPU 502 directly rather than through a bridge, and other devices communicate with system memory 504 via memory bridge 505 and CPU 502. In other alternative topologies display processor 512 is connected to I/O bridge 507 or directly to CPU 502, rather than to memory bridge 505. In still other embodiments, I/O bridge 507 and memory bridge 505 might be integrated into a single chip. The particular components shown herein are optional; for instance, any number of add-in cards or peripheral devices might be supported. In some embodiments, switch 516 is eliminated, and network adapter 518 and add-in cards 520, 521 connect directly to I/O bridge 507.

In the context of the present disclosure, the memory 504 could contain a shading rate determination component 120, configured to compute shading rates for use in processing portions of a 3D scene using one or more shaders. For example, the shading rate determination component 120 could determine a size of a voxel within the 3D scene, and could calculate the shading rate to be proportionate with the voxel's size. As another example, the shading rate determination component 120 could determine a voxel density with a spatial area of the 3D scene, and could calculate the shading rate to be inversely proportionate to the voxel density.

Generally, techniques for rendering volumetric elements involve adding fine grain features to volumes, such as smoke, via temporal advection of the volumes (also referred to as gridless advection). Such techniques may suffer from insufficient detail, resulting in reduced artistic quality. Additionally, techniques for compositing 3D geometric models with voxels may involve direct comparisons of the voxels with the model to determine where the model may be seen through the voxel and where the model obscures the voxel. However, such direct comparisons suffer from computational complexity, and thus long render times.

As such, in some embodiments, voxels are rendered using atemporal, spatial advection of density along the gradient of the density. For instance, the voxels could first be displaced via a motion simulation, and then surface detail may be added to the voxels. Such voxels may be rendered using a warped, and non-uniform grid, allowing for finer surface detail than is available from the representation of the original voxel. As a result, finer detail is possible with reduced render times. Additionally, because such techniques are atemporal, multiple frames need not be analyzed in order to properly render a voxel for a current frame.

In some embodiments, the matte shading rate and pixel shading rate for voxels may be decoupled from each other. A matte shading rate is selected that is optimal for matte shading, while a pixel shading rate is selected that is optimal for pixel shading. As a result, computational cycles are not wasted due to shading at a higher rate than needed for a particular visual result.

In some embodiments, 3D geometric models that include solid surfaces may be modeled as 3D density or deep texture maps. Such a deep texture map may comprise a volumetric representation of the surfaces that contains the depth as one channel and the visibility at the depth. In other words, the deep texture map may be used to determine how much of an element at a particular depth within a 3D scene can be seen from a given point of view. The deep texture map may be compared with the voxels to be rendered, to determine where the voxel is behind the geometric model and where the voxel is in front of the geometric model. This comparison is used to create a hold-out map to create voids within the voxel through which the 3D geometric model may be seen. The voxel is compared with the deep texture map rather than directly with the 3D geometric model, resulting in reduced computational complexity and render time, while maintaining the desired visual effect.

In some embodiments, computer animated films involving outdoor scenes taking place in locations, including, without limitation, highlands, castle fields or the forest, where terrain, rocks, logs, trees, bridges and architectural elements may be covered with rich dense detail, including, without limitation, grass, moss, clover, flowers, hummock, gorse, heather, ferns, leaves, trees, lichen, usnea, branches, insects, and rocks. Rendering voxels into a scene with such elements may be computationally expensive, resulting in long render times.

In some embodiments, a mesh subdivision application protocol interface (API), exemplified by the mesh subdivision API within Renderman®, may be employed in a render-time procedurally-based approach, in contrast to an asset centric pipeline. As a result, high quality images are efficiently produced, with greater artistic control.

In one embodiment, an output driven approach is employed, where intermediate results are computed in association with a final target image. The resulting images may be refactored, generalized and repaired as needed, delaying such processing until a later point in the production. In some cases, a default procedural look and patterns may be sufficient to produce an artistically acceptable result, and such refactoring and repair may not be needed at all. As a result, images are produced quickly using simple prototyping tools. Images are produced early in the production phase, enabling art directors to be involved earlier in artistic decision-making. As such, images exhibiting a desired look suggesting visual complexity may be created, without high render times associated with physically accurate detail.

In some embodiments, curves are employed to render geometric detail, orienting the curves toward the camera viewpoint in order to maximize screen space coverage. Such curves may be created render time directly from the surface mesh. Procedural vegetation may be created by changing curve properties, including, without limitation, the orientation, size, curvature, and deformation of the curves to achieve the desired look. These properties may be driven by noise functions and shaped with "smoothstep" and "pow" functions, and may be further overridden by artist authored data. In one example, many of the details, such as flowers in a patch of grass, would be evoked by simply changing some of the properties of these curves, such as the color and width, rather than by instancing new geometry. Occlusion signals, fake normal vectors for lighting, wind patterns, color variations, and other elements needed for a convincing look may be constructed procedurally by developing formulas to construct, combine and shape such elements. Procedural growth may be computed using various approaches, including, without limitation, via direct computation from the surface, by filling a procedural volume, from a hand modeled leaf-bag, and from an explicit procedural volumetric density field.

In some embodiments, data is neither cached nor pre-computed, thus reducing complexity, and reducing both computational overhead and human time. The computational time spent generating the procedural elements is thereby reduced. Because objects may be created, rendered, and destroyed on demand, shots may be rendered within a memory space of 2 gigabytes (GB) or less. In some cases, underlying tools, as exemplified by PRman, may lack frame-to-frame coherency or suffer from insufficient precision. In such cases, a look driven level-of-detail (LOD) system may be employed, which may perform better than blind stochastic pruning. Such a system may support various functions, including, without limitation, deforming objects, natural procedural wind, fake occlusion, procedural interaction with characters, and inexpensive occlusion into trees and rocks. For wide shots, a projection system may be employed to drive procedural generation by painting in camera. In addition, a real-time preview system may be employed to assist with layout and animation during the production process.

In the preceding, reference is made to embodiments of the invention. However, it should be understood that the invention is not limited to specific described embodiments. Instead, any combination of the described features and elements, whether related to different embodiments or not, is contemplated to implement and practice the invention. Furthermore, although particular embodiments may achieve advantages over other possible solutions and/or over the prior art, whether or not a particular advantage is achieved by a given embodiment is without limitation. Thus, the foregoing aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a rendering application configured with a shading rate determination component 120 within the cloud, in order to render a 2D representation of a 3D scene. The shading rate determination component 120 could then calculate one or more shading rates for use in processing the 3D scene using one or more shaders, based on a voxel size (and/or a voxel density) within the 3D scene (and/or a portion of the 3D scene). Doing so allows a user to efficiently render a 2D representation of the 3D scene from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of rendering a representation of a volumetric element in a three-dimensional scene from a first point of view, comprising:
   determining a measure of viewable area of the volumetric element, based on: (1) a size of the volumetric element relative to the first point of view, (2) a shape of the volumetric element relative to the first point of view, and (3) an orientation of the volumetric element relative to the first point of view;
   calculating a shading rate to use in processing the volumetric element, based on the determined measure of viewable area and further based on a volumetric element density within a region of the three-dimensional scene, wherein the shading rate defines a frequency at which the volumetric element is sampled when rendering the three-dimensional scene, and wherein the volumetric element density specifies a number of voxels within a defined region in the three-dimensional scene; and
   rendering a frame representing a depiction of the three-dimensional scene, wherein the frame includes the representation of the volumetric element from the first point of view, and wherein rendering the frame comprises processing, by operation of one or more computer processors, the volumetric element at the calculated shading rate using one or more shaders.

2. The method of claim 1, wherein the calculated shading rate is proportional to the measure of viewable area of the volumetric element.

3. The method of claim 2, wherein the shading rate is calculated by applying a constant multiplier value to the measure of viewable area of the volumetric element.

4. The method of claim 1, wherein the calculated shading rate is inversely proportional to the volumetric element density within the region of the three-dimensional scene.

5. The method of claim 1, wherein the volumetric element comprises a three-dimensional polygon, that is not cubic in shape.

6. A system, comprising:
   a processor; and
   a memory containing a program that, when executed by the processor, performs an operation for rendering a representation of a volumetric element in a three-dimensional scene from a first point of view, comprising:
      determining a measure of viewable area of the volumetric element, based on: (1) a size of the volumetric element relative to the first point of view, (2) a shape of the volumetric element relative to the first point of view, and (3) an orientation of the volumetric element relative to the first point of view;
      calculating a shading rate to use in processing the volumetric element, based on the determined measure of viewable area and further based on a volumetric element density within a region of the three-dimensional scene, wherein the shading rate defines a frequency at which the volumetric element is sampled when rendering the three-dimensional scene, and wherein the volumetric element density specifies a number of voxels within a defined region in the three-dimensional scene; and rendering a frame representing a depiction of the three-dimensional scene, wherein the frame includes the representation of the volumetric element from the first point of view, and wherein rendering the frame comprises processing, by operation of one or more computer processors, the volumetric element at the calculated shading rate using one or more shaders.

7. The system of claim 6, wherein the calculated shading rate is proportional to the measure of viewable area of the volumetric element.

8. The system of claim 7, wherein the shading rate is calculated by applying a constant multiplier value to the measure of viewable area of the volumetric element.

9. The system of claim 6, wherein the calculated shading rate is inversely proportional to the volumetric element density within the region of the three-dimensional scene.

10. The system of claim 6, wherein the volumetric element comprises a three-dimensional polygon, that is not cubic in shape.

11. A non-transitory computer-readable medium containing a program that, when executed, performs an operation for rendering a representation of a volumetric element in a three-dimensional scene, the operation comprising:

determining a measure of viewable area of the volumetric element, based on: (1) a size of the volumetric element relative to the first point of view, (2) a shape of the volumetric element relative to the first point of view, and (3) an orientation of the volumetric element relative to the first point of view;

calculating a shading rate to use in processing the volumetric element, based on the determined measure of viewable area and further based on a volumetric element density within a region of the three-dimensional scene, wherein the shading rate defines a frequency at which the volumetric element is sampled when rendering the three-dimensional scene, and wherein the volumetric element density specifies a number of voxels within a defined region in the three-dimensional scene; and rendering a frame representing a depiction of the three-dimensional scene, wherein the frame includes the representation of the volumetric element from the first point of view, and wherein rendering the frame comprises processing, by operation of one or more computer processors, the volumetric element at the calculated shading rate using one or more shaders.

12. The non-transitory computer-readable medium of claim 11, wherein the calculated shading rate is proportional to the measure of viewable area of the volumetric element.

13. The non-transitory computer-readable medium of claim 12, wherein the shading rate is calculated by applying a constant multiplier value to the measure of viewable area of the volumetric element.

14. The non-transitory computer-readable medium of claim 11, wherein the calculated shading rate is inversely proportional to the volumetric element density within the region of the three-dimensional scene.

15. The non-transitory computer-readable medium of claim 11, wherein the volumetric element comprises a three-dimensional polygon, that is not cubic in shape.

* * * * *

UNITED STATES PATENT AND TRADEMARK OFFICE
CERTIFICATE OF CORRECTION

PATENT NO. : 9,684,997 B2
APPLICATION NO. : 13/928984
DATED : June 20, 2017
INVENTOR(S) : Alexis Angelidis et al.

It is certified that error appears in the above-identified patent and that said Letters Patent is hereby corrected as shown below:

On the Title Page

In item (71), in Column 1, in "Applicant", Lines 1-2, delete "Bill Watral," and insert -- William L. Watral, --, therefor.

In item (71), in Column 1, in "Applicant", Lines 2-3, delete "Danny Nahimias," and insert -- Jean-Daniel Nahmias, --, therefor.

In item (72), in Column 1, in "Inventors", Lines 1-2, delete "Bill Watral," and insert -- William L. Watral, --, therefor.

In item (72), in Column 1, in "Inventors", Lines 2-3, delete "Danny Nahimias," and insert -- Jean-Daniel Nahmias, --, therefor.

In the Specification

In Column 2, Line 28, after "herein" insert -- . --.

In Column 5, Line 35, delete "o ne" and insert -- one --, therefor.

Signed and Sealed this
Twenty-fourth Day of July, 2018

Andrei Iancu
*Director of the United States Patent and Trademark Office*